United States Patent [19]

Johnson et al.

[11] 4,003,504

[45] Jan. 18, 1977

[54] PUMP FRAME

[75] Inventors: Gerald William Johnson, Minneapolis; Robert David Lerum, Crystal, both of Minn.

[73] Assignee: Spray Tech Corporation, Minneapolis, Minn.

[22] Filed: Apr. 21, 1975

[21] Appl. No.: 569,888

[52] U.S. Cl. .............................. 222/178; 214/384; 239/149; 417/234; 417/360

[51] Int. Cl.$^2$ ...................... B62B 1/06; F04B 21/00

[58] Field of Search ........... 222/178, 176, 164–165; 214/384; 280/47.17, 47.18, 47.24; 239/149; 248/129, 133, 96, 98; 417/234, 360

[56] References Cited

UNITED STATES PATENTS

| | | | |
|---|---|---|---|
| 1,825,013 | 9/1931 | Patton | 222/178 X |
| 1,870,097 | 8/1932 | Coller | 214/384 |
| 2,231,229 | 2/1941 | Spreng | 222/178 |
| 3,180,507 | 4/1965 | Ott et al. | 214/384 |
| 3,598,420 | 8/1971 | Edlin | 214/384 X |
| 3,797,743 | 3/1974 | Kommers et al. | 222/176 X |

FOREIGN PATENTS OR APPLICATIONS

| | | | |
|---|---|---|---|
| 1,031,238 | 3/1953 | France | 214/384 |
| 1,192,717 | 4/1959 | France | 214/384 |
| 1,321,211 | 10/1956 | Germany | 214/384 |

*Primary Examiner*—Stanley H. Tollberg
*Assistant Examiner*—Charles A. Marmor
*Attorney, Agent, or Firm*—Hill, Gross, Simpson, Van Santen, Steadman, Chiara & Simpson

[57] ABSTRACT

A pump assembly including a wheeled frame supporting a pump in an elevated position with the intake to the pump depending below the pump and into the interior of a container equipped with a bail, the container being supported by the frame from the bail in a manner which allows the container to freely pivot to maintain an upright condition during lifting of the container by tilting of the frame on the wheels for transportation of the frame, pump and container as a unit.

5 Claims, 5 Drawing Figures

U.S. Patent  Jan. 18, 1977  Sheet 1 of 2  4,003,504
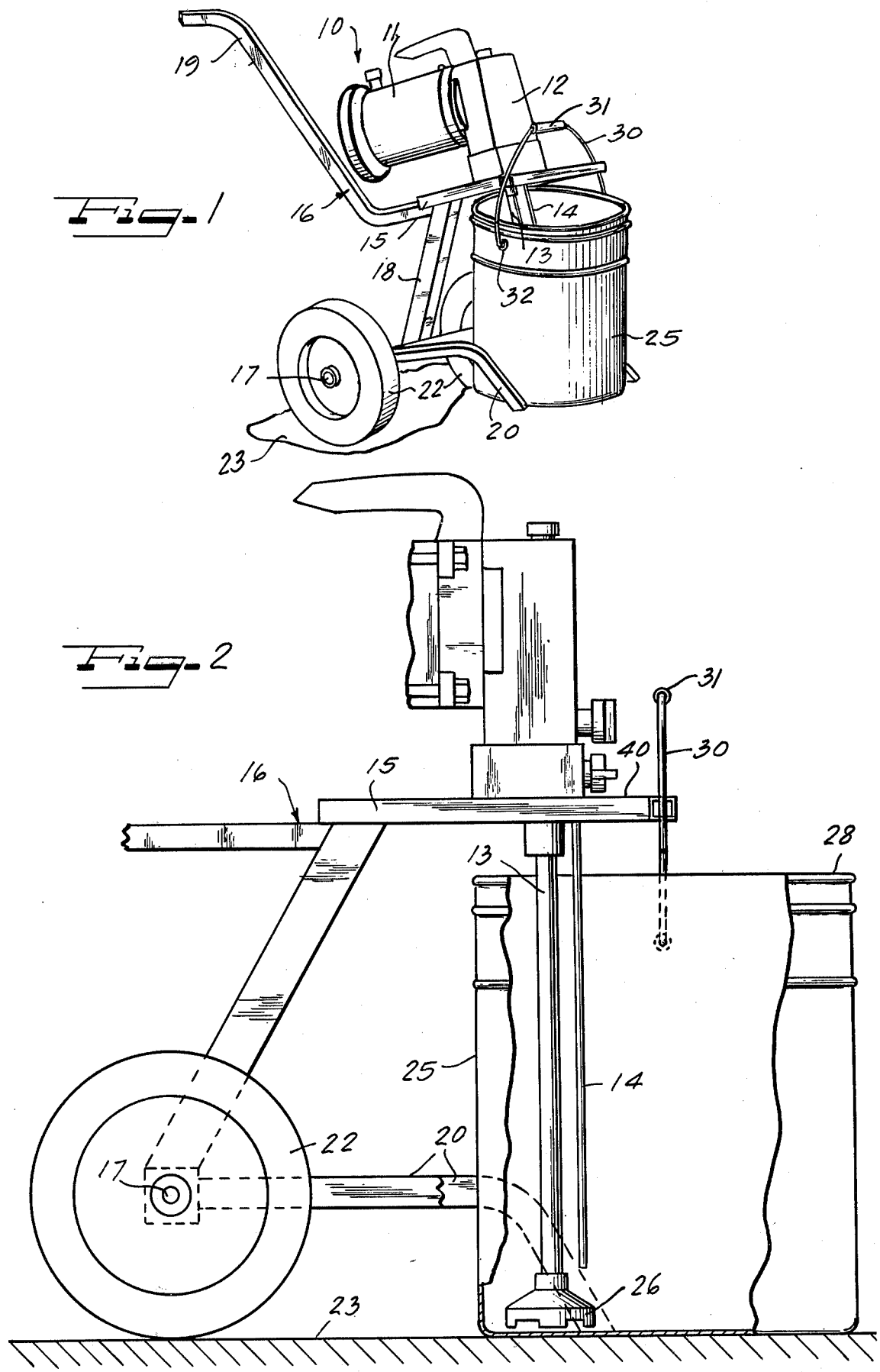

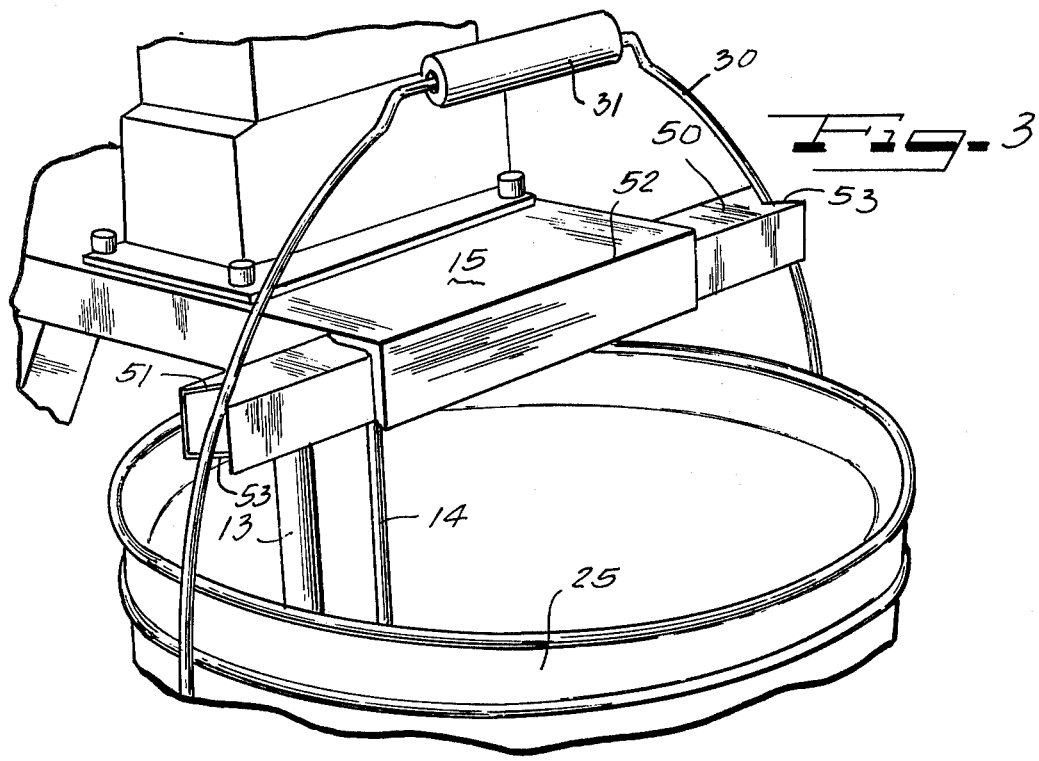
Fig. 3
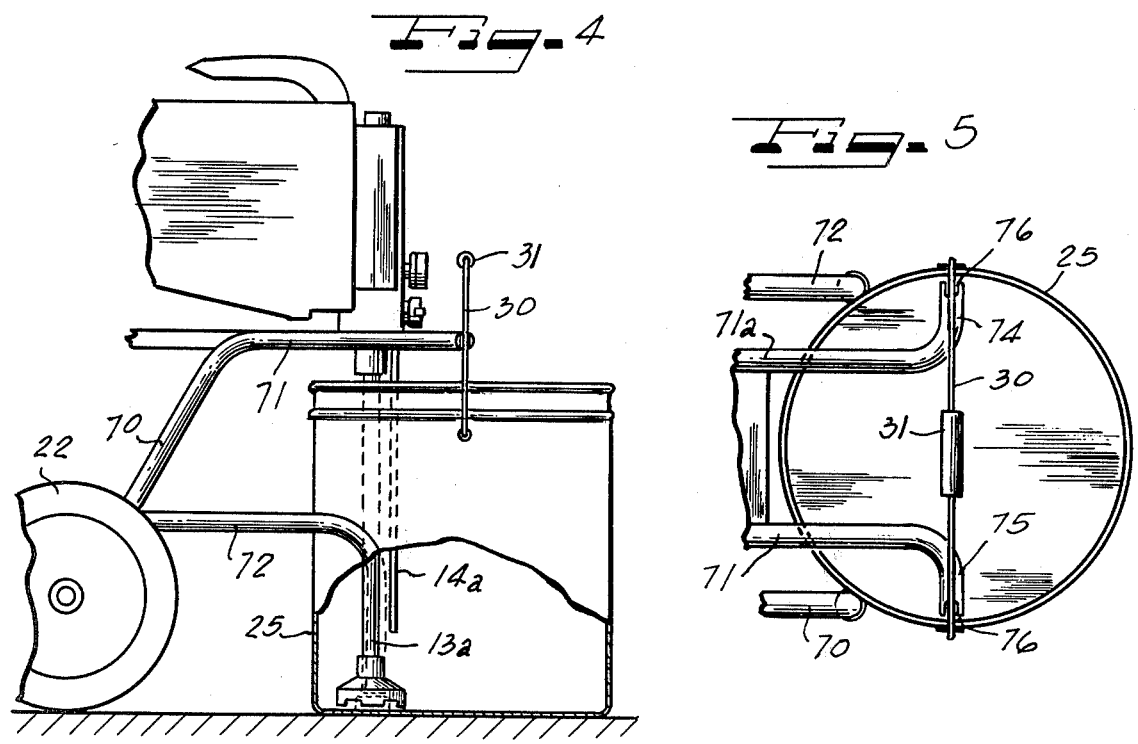
Fig. 4
Fig. 5

PUMP FRAME

BACKGROUND OF THE INVENTION

1. Field of the Invention

This invention relates to easily transported spray pumps and more particularly to a frame assembly for such pumps.

2. Description of the Prior Art

Large spray pump assemblies are normally mounted on wheeled frames or carriges for ease of positioning around a job site. Such frames have, at times, included built-in containers for the liquid being sprayed, normally paint. In the past where such built-in containers were not used, because the paint was normally removed from the container under pressure or by air venturi and therefore required a sealed container, means were provided on the frame for affixing the paint container.

With the recent development of airless spraying devices which do not need air pressure tanks, reservoirs, or the like, the frames have become considerably smaller and less complicated. One of the first devices eliminated was the paint container. Since in airless pumps, the container does not have to be closed in order for the pump to remove the paint, there was no need for specific attachment of the pump to the container. As a result, the frames for the pump normally elevated the pump so that an intake conduit depending from the pump could be inserted into a paint container by lifting the pump over the edge of the paint container. However when it became desirable to move the assembly to a different location, it was necessary for one person to transport the pump while another person independently transported the paint container. Since the intake conduit depending from the pump extended into the paint container, it was necessary that this movement by separate individuals be in unison. As a result, spillage often is incurred. However, because removal of the intake conduit from the container would result in paint dripping from the intake conduit, it was not thought possible to easily solve the problem without resort to special built-in paint containers permanently mounted on the frame.

Since one of the highly desirable features of airless paint spray equipment is the ease of transportant of such devices because of the elimination of associated equipment such as air pressure tanks, large air compressors and the like, the addition of any extra equipment, such as paint containers, to the frame would be undesirable.

It would therefore be an advance in the art to develop a method of affixing the normally used paint containers to the pump frame for ease of transportation therewith. However, the pump frames are normally two wheeled and are designed to be pivotable about the wheels so as to lift the substantially rigid intake conduit up over the edge of the paint container without the necessity of lifting the entire pump and frame. Because of this, it is normal to transport the pump by pivoting the frame around the wheels to a tilted relationship with the ground. Therefore, if the paint container were to be affixed to the pump frame, tilting of the pump frame to transport the assembly around a job site would result in spillage of paint from the container.

SUMMARY OF THE INVENTION

We have overcome the disadvantages of the prior art by supporting the paint container from the pump frame in a manner which allows simplicity of attachment while at the same time allowing pivoting of the container with respect to the remainder of the frame. By allowing the container to pivot with respect to the remainder of the frame, when the frame is tilted by pivoting around the axis of the wheels for transportation, the weight of the container and the paint therein will insure that the container will remain, at all times, in an upright position.

The desired result is achieved by supporting the container by its bail. The vast majority of paint containers are pails which have bails rotatably affixed thereto, the bail consisting of an arched wire handle, the opposed ends of which are rotatably received in fasteners on diametrically opposed sides of the pails. By supporting the cotainer from the bail, the container remains free to rotate with respect to the bail. In addition, the preferred attachment disclosed herein allows pivoting of the bail with respect to the frame. In this manner it is assured that paint will not be spilled during transportation of the pump and container.

Further, in the preferred embodiment illustrated the bail is gripped from the inside surface thereof on opposed sides of the central portion of the apex of the bail. Bail grasping means are provided which are spaced apart by a distance which is less than the maximum spacing of the bail at its ends attached to the containers but greater than the apex width. In this manner when the bail is correctly positioned with respect to the bail grasping means, the pail can move downwardly with respect to the bail grasping means only until the point when each of the spaced apart bail grasping means contacts an inside surface of the bail. Thereafter, any upward movement of the bail grasping means will move the pail upwardly also.

In order to provide for simplicity of attachment, the bail grasping means are provided as notches preferably of a v-shaped configuration, which are open outwardly away from one another. Thus the bail will be received in the slots from the open end until the bailed container has moved downwardly with respect to the notches to the point where the bail is wedged into the notches due to its decreasing dimensions. At this point the container will be held by the frame.

In the preferred embodiments illustrated, the notches lie forward of the wheels of the pump frame and the paint pump is suspended with respect to the notches such that the intake conduit will depend downwardly into a container held by its bail being entrapped in the notches. Additionally, since standard sized paint containers have substantially identical shaped bails, it is possible to pre-arrange the positioning of the notches such that the paint container will be held by the notches at a level where the inlet end of the inlet conduit will be at or very closely spaced to the bottom of the pail thereby assuring full removal of contents during spraying. Additionally, it can be designed such that this correct positioning of the pail will result in the pail resting on the same surface as the wheels of the frame when the frame is fully horizontal. Therefore, the weight of the container will not be carried by the bail except during transportation.

It is therefore an object of this invention to provide a spray paint pump frame, particularly for use with airless paint sprayers, the frame being equipped with paint container holding means, the means grasping the paint container bail.

It is another and more detailed object of this invention to provide an airless spray painting pump supporting wheeled frame which is equipped with grasping means for attaching a bailed paint container to the pump frame for transportation therewith, the attachment being through the bail and allowing pivoting of the container with respect to the frame.

Other objects, features and advantages of the invention will be readily apparent from the following description of a preferred embodiment thereof, taken in conjunction with the accompanying drawings, although variations and modifications may be affected without departing from the spirit and scope of the novel concepts of the disclosure, and in which:

BRIEF DESCRIPTION OF THE DRAWINGS

FIG. 1 is a perspective view of an airless spray painting pump and frame assembly equipped with the container attaching means of this invention.

FIG. 2 is a fragmentary side plan view with portions broken away of the assembly of FIG. 1.

FIG. 3 is an enlarged perspective view of the bail grasping means of this invention.

FIG. 4 is a view similar to FIG. 2 on a reduced scale showing a modified assembly.

FIG. 5 is a fragmentary top plan view of the modification of FIG. 4.

DESCRIPTION OF THE PREFERRED EMBODIMENT

FIG. 1 illustrates a spray pump and frame assembly 10 tilted in a transport position. The electrical lines and delivery hoses have been omitted for purposes of clarity. The assembly includes a pump motor 11, a pump 12 having an inlet conduit 13 and a return conduit 14 with the pump being mounted on a pump support platform 15 which is part of a wheeled frame 16. The platform 15 is elevated above a wheel axle 17 by means of a frame support 18. A handle 19 extends upwardly and backwardly of the frame support. The pump and motor are placed forward of the axle 17 and transversely spaced parallel leg supports 20 extend forward from the axle to cooperate with wheels 22 on the axle 17 to balance the assembly.

FIG. 2 illustrates a fragmentary portion of the frame 16 in the rest position with the wheels 22 resting on a surface 23 and the support legs 20 having their ends also resting on the support surface as indicated by the broken lines.

The length of the intake conduit 13 is such that when the leg supports 20 are bottomed on the same support surface as the wheels, the intake conduit will extend into close proximity with the support surface.

In normal use, the container of fluid to be pumped 25 is positioned under the platform 15 between the support legs 20. In this position the intake contuit 13 will extend downwardly into the container and will terminate in very close spaced relation to the bottom of the container so as to be able to remove substantially the entirety of the contents of the container.

Insertion of the conduit into the container is accomplishable by tilting the assembly around the axle of the wheels until the free end 26 of the intake conduit 13 is higher than the top 28 of the container. Thereafter by reverse pivoting of the frame to the rest position, the intake conduit will be lowered into the container.

This type of frame has found ready acceptance within the industry and the ease of inserting and removing the intake conduit from containers has found to be extremely desirable. For example, it is relatively easy to switch the assembly to different containers when one container has been emptied or when it is desired to switch to different types of fluid to be pumped. In addition, a primary feature is the ability to use standard paint containers. The most often used paint container is a five gallon pail and the length of the intake conduit and the positioning of the platform 15 above the support surface are normally such that standard sized 5 gallon containers can be easily utilized. Such containers are constructed with bails 30 which consist of arched wire handles which may be equipped with a central protective handle member 31. The free ends of the arched wire bail 30 are received in fasteners 32 on diametrically opposed sides of the pail. The fasteners allow rotation of the bail 30 with respect to the pail in one plane.

Heretofore, when the assembly 10 was being transported about the job site, it was necessary to independently transport the pail 25. Since the intake conduit 13 and the return conduit 14 were projecting into the pail and could not be removed therefrom without spillage of paint, transportation involved the necessity of using two people, one to move the frame and one to move the container. Further these people had to operate in unison in order to avoid spillage.

However since the frame is a two wheel frame and transportation is accomplished by pivoting the frame to raise the support legs 20 off of the support surface, any attempt to affix the container to the frame for transportation therewith would have resulted in tipping the container thereby spilling paint. This invention overcomes these disadvantages by supporting the container from an extension 40 of the support platform 15 by means of the bail 30. Since the only attachment between the frame and the container is through the bail 30, and since the bail is allowed to pivot with respect to the container through the fasteners 32, by aligning the bail with the axle 17 of the wheels, it can be assured that as the frame is tilted backwardly around the axle, the bail to container support will allow pivoting of a container so that it will always remain in an upright position.

In the preferred embodiment illustrated, the attachment device for the bail consists of two extending members 50 and 51 which project laterally of the support platform extension 40 adjacent the front end 52 thereof. The extensions 50 and 51 terminate in v-shaped notches 53 which are spaced apart parallel to the axle 17 by a distance such that the bottoms of the v-shaped notches will be spaced apart by an amount which is slightly greater than the dimensions of the bail at the same elevation. Since the container 25 and bail 30 are substantially standard throughout the industry, it is possible to determine in advance what the inside dimension of the bail will be at any point above the container bottom. The notches are spaced apart by a distance which is slightly larger than the determined distance of the bail in order to insure that the container will be adequately supported. Further, it is desired that the support contact with the bail be relatively widely spaced from the apex of the bail. The further the contact with the bail from the apex of the bail, the better the dimensional stability of the support. If the supporting notches are too close together, the resultant stress on the bail during tilting of the frame and lifting of the container may lead either to tilting of the container in the plane parallel to the axle or can result in a bending of the bail.

However, in order to provide ease of attachment, it is desired that the bail at its widest extent above the top of the container have a dimension greater than the spacing between the outside faces of the notches. In this manner, the container can easily be attached to the notches by lifting the container until the bail can be slipped over the ends of both of the extensions 50 and 51. Thereafter lowering the container will cause the decreasing spacing of the opposed inside surfaces of the bail to result in a bail to notch wedged contact.

Additionally, because standard bails will deform slightly when supporting the entire load of a full container, it is desirable to make the contact point between the bottom of the notches and the inside surfaces of the bail at a point which would normally result in the container being held slightly off of the support surface. Thereafter the bail will deform by spreading slightly to allow the container to rest on the support surface. In this manner, it is assured that when tilting of the frame occurs the container will be almost immediately lifted. By use of the opposed V notches as illustrated in FIG. 3, the attachment of the bail to the frame occurs at two spaced points. Rotation between the bail and the frame can occur at those points because of the limited contact area. This means that not only is the container free to rotate with respect to the bail because of the fasteners 32, but the bail is also free to rotate in the same plane with respect to the frame. This further insures that the container will remain in an upright position during transport of the assembly. Additionally, the use of v-shaped notches insures that the connection will be securely wedged while providing boundary surfaces to insure that the bail cannot fall away from the connection when the pail is supported on the support surface 23.

FIGS. 4 and 5 illustrate a modification of the above described bail support wherein the frame is constructed of tubular members 70 which extend upwardly from the axle and project outwardly horizontally to the support surface at 71 when the support legs 72 are in contact with the support surface. In this construction the platform may be attached between the two tubular members 71 and 71a or the pump itself can be attched to the members without use of a separate platform. The tubular members project outwardly beyond the intake and return conduits 13a and 14a and terminate in outwardly extending portions 74 and 75. These outwardly extending portions have notches or grooves 76 in their end surfaces for contacting the bail in the same manner as the notches 53. Further, as illustrated in FIG. 5, where it is desired to limit tilting of the container with respect to the tilted frame, the support legs 72 can be positioned to engage the outside 73 of the container to limit tilting. This has the effect of preventing the container from swinging during transport.

It is to be noted that in both embodiments the bail-frame attachment is forward of the front face of the pump. This not only allows the bail to be easily grasped and lifted but also allows clearance for pump controls on the front face.

It can therefore be seen from the above that our invention provides an airless spray pump assembly including a frame carrying the spray pump in an elevated position with an intake conduit depending from the pump into a clear space below the pump for insertion into a paint container, the paint container being carried by the frame by an interference connection between portions of the frame and spaced apart portions of the container bail whereby tilting of the frame about transport wheels having an axle spaced from the connection will result in lifting the container while allowing it to swing with respect to the frame to maintain an upright position.

Although the teachings of our invention have herein been discussed with reference to specific theories and embodiments, it is to be understood that these are by way of illustration only and that others may wish to utilize our invention in different designs or applications.

We claim as our invention:

1. A tiltable easily transported wheeled frame for supporting a pump with an intake extending into a removable bail equipped container for material to be pumped wherein the frame may be tilted to swing the intake into bailed container resting on the ground and the bail of the container easily attached to the frame to swingably suspend the container from the frame and avoid spillage of the material therein when the frame is transported which comprises, a pair of laterally spaced wheels, a frame supported on said wheels having forwardly projecting legs adapted to rest on the ground to cooperate with the wheels for holding the frame in an upright position, a pump support means above said legs, and a handle extending rearwardly beyond said wheels adapted to be manually depressed to tilt the frame about the wheels and lift the legs off the ground and pushed or pulled for rotating the wheels to transport the tilted frame, a bail suspension device on said frame forwardly of said wheels adapted to receive the bail of a container therearound and having spaced means underlying the bail with outwardly opening grooves at opposite ends of the device with their bottoms spaced apart a sufficient distance to engage the both sides of the bail in spaced relation from the apex thereof intermediate the pivoted ends of the bails and the apex of the bail and positioned at an elevation on the frame to accommodate the bailed container to be suspended therefrom to rest on the ground when said legs of the frame are on the ground and to lift the container off of the ground for transport with the frame when the handle of the frame is depressed to lift the legs off of the ground, and said suspension device cooperating with said frame to accommodate swinging of a bailed container suspended from said device to avoid tilting of the container to a spilling position when the frame is tilted for transportation.

2. A spray pump assembly comprising a two wheeled frame with spaced support legs having a rest ground engaging position in front of the two wheels cooperating with the wheels to hold the frame in an upright position, a handle on said frame extending rearwardly from said wheels adapted to be manually depressed for pivoting the frame around the wheels to lift the support legs off of the ground and adapted to be pushed or pulled for transporting the frame on the wheels, an elevated pump support above said legs on said frame, a pump mounted on said pump support, a pump carried pump inlet conduit depending from said pump between said legs forwardly of said wheels into closely spaced relation with the ground when said legs rest on the ground, a bailed container support on said frame having two laterally spaced open ended slots forwardly of and parallel with the axis of said wheels, said slots opening away from each other and having a width and length dimensioned to receive the legs of a container bail on opposite sides of the apex of the bail, said container support being mounted at a level on said frame to suspend a bailed container in an upright position when the frame legs are raised from the ground and to permit the container to rest on the ground when the frame legs rest on the ground, and said inlet conduit adapted to be raised and tilted into a container resting on the ground between said legs when said handle is depressed to pivot the frame and lift the legs off of the ground.

3. A portable spray pump assembly adated to detachably suspend a bail equipped pail in an upright position when manually tilted and rest the pail on the ground when freed from a manual tilting force which comprises a frame having forwardly projecting spaced parallel bottom legs with front portions adapted to rest on the ground for holding the cart in an upright position, wheels at the rear ends of said legs supporting said rear ends of said legs above the ground, an upright frame member extending from the rear ends of the legs, a platform carried by said upright frame member extending forwardly above said legs, a handle extending rearwardly from said upright frame member adapted to be manually depressed for tilting the frame about said wheels to raise said front portions of the legs off of the ground and adapted to be pushed or pulled to rotate the wheels and transport the frame, a pump mounted on said platform having a depending inlet conduit between said legs, a bail suspension device on said frame in front of said platform having laterally spaced oppositely opening notches adapted to receive the arched bail of a pail positioned between said legs and engage opposite side legs of the bail in spaced relation from the apex of the bail, said suspension device adapted to suspend the pail from its bail with the end of the conduit adjacent the bottom of the pail, and said suspension device cooperating with said frame to accommodate swinging of the pail on its bail to maintain an upright pail position as the frame is tilted.

4. The assembly of claim 3 wherein the suspension device is positioned forwardly of the front portions of said legs at a level cooperating with said front portions of the legs to lift a pail suspended thereby only when the legs are raised off of the ground.

5. A portable airless spray painting assembly adapted to detachably suspend a bail equipped pail in an upright position when manually tilted and rest the pail on the ground when freed from a manually tilting force which comprises a two wheeled frame having legs projecting forwardly from the wheels adapted to rest on the ground to hold the frame in an upright position and a handle projecting rearwardly from the wheels to be depressed tilting the frame about the wheels for lifting the legs off the ground and pushed or pulled to transport the frame on the wheels, a motor driven pump mounted on the frame forwardly of the wheels and above the legs holding the legs on the ground until the handle is depressed, said pump having an inlet conduit depending therefrom into close spaced relation with the ground when the frame legs are resting on the ground, a bail suspension device mounted on the frame forwardly of said motor driven pump at a level to receive therearound the bail of a bailed pail resting on the ground in front of said legs of the frame and having means for underlying and engaging opposite side legs of the bail for lifting the pail when the handle is depressed to tilt the frame and raise the frame legs off of the ground, said frame adapted to be tilted to rotate said inlet conduit into a bailed pail resting on the ground in front of said frame legs with the end of the inlet conduit at a level closely adjacent the bottom of the pail, and said means of said suspension device being at a level on said frame to suspend the pail from the frame with the inlet end of the conduit close to the bottom of the pail.

* * * * *